United States Patent
Hedler et al.

(10) Patent No.: US 9,097,808 B2
(45) Date of Patent: Aug. 4, 2015

(54) RADIATION DETECTOR AND IMAGING SYSTEM

(75) Inventors: Harry Hedler, Germering (DE); Timothy Hughes, Erlangen (DE); Martin Spahn, Erlangen (DE); Stefan Wirth, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 19 days.

(21) Appl. No.: 14/124,713

(22) PCT Filed: May 21, 2012

(86) PCT No.: PCT/EP2012/059388
§ 371 (c)(1),
(2), (4) Date: Dec. 7, 2013

(87) PCT Pub. No.: WO2012/168057
PCT Pub. Date: Dec. 13, 2012

(65) Prior Publication Data
US 2014/0103219 A1    Apr. 17, 2014

(30) Foreign Application Priority Data
Jun. 7, 2011    (DE) .......................... 10 2011 077 057

(51) Int. Cl.
*G01T 1/20* (2006.01)
*G01T 1/28* (2006.01)

(52) U.S. Cl.
CPC ................. *G01T 1/2006* (2013.01); *G01T 1/20* (2013.01); *G01T 1/28* (2013.01)

(58) Field of Classification Search
CPC .................................................... G01T 1/2006
USPC .......................................... 250/366, 369, 367
See application file for complete search history.

(56) References Cited

U.S. PATENT DOCUMENTS

| | | |
|---|---|---|
| 5,017,782 A | 5/1991 | Nelson |
| 2004/0195520 A1 | 10/2004 | Bateman et al. |

(Continued)

FOREIGN PATENT DOCUMENTS

| | | |
|---|---|---|
| DE | 102004006998 A1 | 10/2004 |
| WO | 2010094272 A2 | 8/2010 |

OTHER PUBLICATIONS

German Office Action dated Sep. 25, 2012 in corresponding German Patent Application No. DE 10 2011 077 057.7 with English translation.

(Continued)

*Primary Examiner* — David Porta
*Assistant Examiner* — Abra Fein
(74) *Attorney, Agent, or Firm* — Lempia Summerfield Katz LLC

(57) ABSTRACT

The invention relates to a radiation detector (100; 101; 102; 103; 104; 105; 106), having a scintillator (120) for generating electromagnetic radiation (202) in response to the action of incident radiation (200). The scintillator (120) has two opposing end faces (121; 122) and a lateral wall (123) between the end faces (121; 122). The radiation detector has, in addition, a photocathode section (130) that is located on the lateral electrons wall (123) of the scintillator (120) and that generates electrons (204) in response to the action of electromagnetic radiation (202) that is generated by the scintillator (120), a microchannel plate (161; 162) comprising a plurality of channels (165), for multiplying the electrons (204) that have been generated by the photocathode section (130) and a detection system (171; 172) for detecting the electrons (204) that have been multiplied by means of the microchannel plate (161; 162). The invention also relates to an imaging system (110) comprising a radiation detector of this type (100; 101; 102; 103; 104; 105; 106).

11 Claims, 9 Drawing Sheets

(56) References Cited

U.S. PATENT DOCUMENTS

2009/0256063 A1   10/2009   Sullivan et al.
2010/0270462 A1   10/2010   Nelson et al.

OTHER PUBLICATIONS

H. Kim et al., "A Design of a PET Detector Using Micro-Channel Plate Photomultipliers with Transmission-Line Readout", Nuclear Instruments and Methods in Physics Research A, Oct. 21, 2010, pp. 628-636, vol. 622, No. 3, Elsevier, North-Holland, Netherlands.

Heejong Kim, "Use of Flat Panel Micro-Channel Photomultiplier in Sampling Calorimeter with Timing", Nuclear Science Symposium Conference Record (NSSI MIC), 2010 IEEE, Oct. 30, 2010, pp. 1707-1710.

International Search Report and Written Opinion in PCT/EP2012/059388, dated Dec. 14, 2012, with English translation.

Martin Spahn, "Flat Detectors and their Clinical Applications", Eur Radiol., Apr. 2, 2005, pp. 1934-1947, vol. 15.

Nicolas Ollivier-Henry et al., "Design and Characteristics of a Multichannel Front-End ASIC Using Current-Mode CSA for Small-Animal PET Imaging", IEEE Transactions on Biomedical Circuits and Systems, Feb. 2011, pp. 90-99, vol. 5, No. 1.

FIG 7
FIG 8
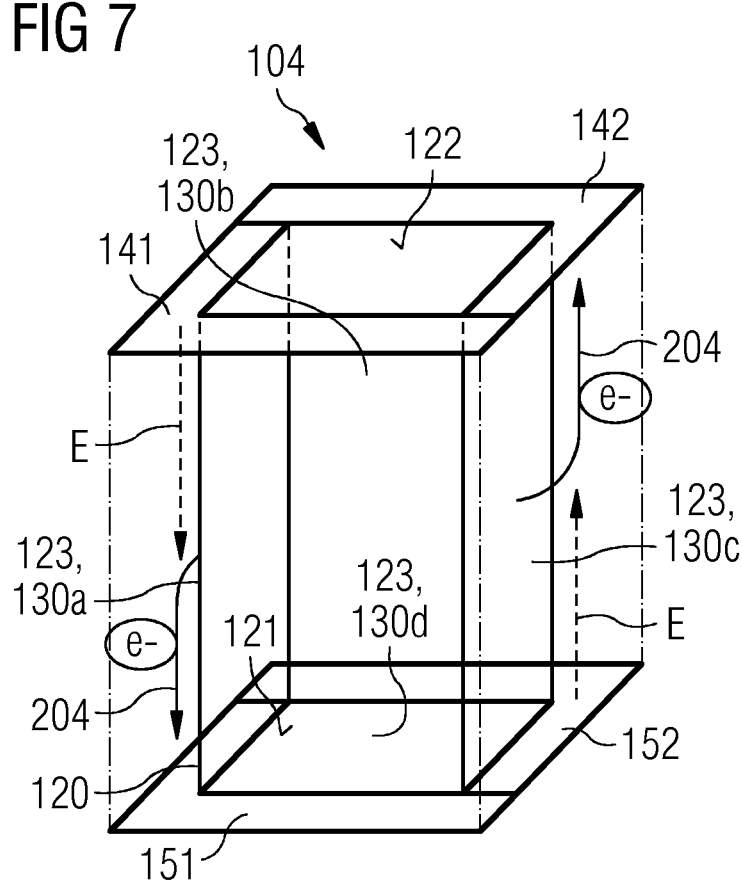
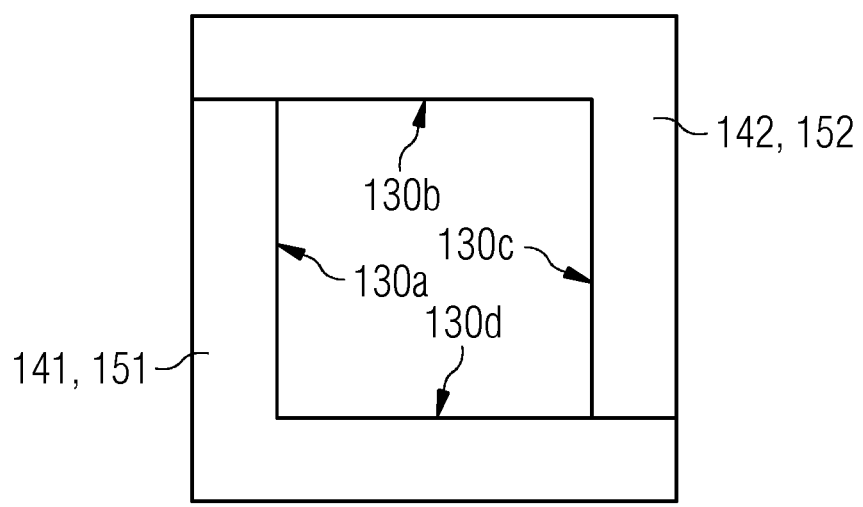

RADIATION DETECTOR AND IMAGING SYSTEM

This application is the National Stage of International Application No. PCT/EP2012/059388, filed May 21, 2012, which claims the benefit of German Patent Application No. DE 10 2011 077 057.7, filed Jun. 7, 2011. The entire contents of these documents are hereby incorporated herein by reference.

BACKGROUND

The present embodiments relate to a radiation detector that may be used to detect electromagnetic radiation.

Imaging systems appertaining to medical technology are becoming increasingly important nowadays. Systems of this type are used to generate two- or three-dimensional image data of organs and structures of the human body, which may be used, for example, for diagnosing causes of illness, for carrying out operations, and for preparing therapeutic measures. The image data may be generated based on measurement signals obtained with the aid of a radiation detector.

This is the case, for example, in X-ray and computed tomography systems (CT). In systems of this type, the body or a body section of a patient to be examined is radiographed by X-ray radiation generated by a radiation source. The non-absorbed, transmitted portion of radiation is detected by a detector.

A further example is image generation with the aid of radionuclides, such as is used in positron emission tomography systems (PET) and single photon emission computer tomography systems (SPECT). In this case, the patient to be examined is injected with a radiopharmaceutical that generates gamma quanta either directly (SPECT) or indirectly (PET) through emission of positrons. The gamma radiation is detected by a corresponding radiation detector.

Detectors that may be used for the energy-resolved detection or "counting" of radiation quanta may operate according to different measurement principles. Radiation may be detected either directly (e.g., by direct conversion of the radiation energy into electrical energy) or indirectly. In the case of the last-mentioned variant, use is generally made of a scintillator, which is excited in response to the action of radiation to be detected and reemits the excitation energy by emitting lower-energy electromagnetic radiation. Only the radiation emitted by the scintillator is converted into electrical measurement signals in this case. Detectors of planar construction (e.g., "flat detectors") that are used in the medical field and operate in accordance with these measurement principles are described, for example, in M. Spahn, "Flat detectors and their clinical applications," Eur Radiol (2005), 15: 1934-1947.

The conversion of the radiation emerging from a scintillator into an electrical signal may be effected in various ways. Besides use of a photomultiplier provided with a photocathode in the form of an evacuated electron tube, one concept that is common at the present time includes using a silicon photomultiplier ("SiPM"). This involves a matrix arrangement of avalanche photodiodes (APD) embodied on a shared substrate, electrons being generated in the photodiodes as a result of incident photons, and the electrons being multiplied in an avalanche-like manner.

One disadvantage of silicon photomultipliers, however, is that only part of the total area available for irradiation may be utilized as sensitive or "active" area. The reason for this is that between the active or radiation-sensitive regions there are also insensitive regions, in which resistors and signal lines or wiring structures are arranged. A silicon photomultiplier therefore has a relatively small ratio of active area to total area (e.g., irradiated total area). The ratio is also designated as "filling factor." Further disadvantages include noise that occurs during operation, and a relatively high dark rate or dark count. In other words, signal generation takes place even without irradiation.

A detector including a scintillator and a silicon photomultiplier may be embodied such that the silicon photomultiplier is opposite an end face or rear side of the scintillator. An opposite end face or front side of the scintillator faces the radiation to be detected. As a result, the silicon photomultiplier may detect only that portion of the radiation converted in the scintillator that emerges at the rear side thereof. Proceeding from the respective excitation or interaction location in the scintillator, however, the scintillation radiation is emitted not only in the direction of the rear side, but also in other directions. The radiation is subject to loss processes such as reflection, absorption and scattering. In the case of scintillators having a high aspect ratio (e.g., a high ratio of height to width), as may be the case for example in a PET system, the losses are therefore relatively high. In the case of an aspect ratio of greater than 7:1, the radiation emerging from a scintillator may make up a proportion of merely 40-60% of the total radiation generated. Although a higher intensity of the incident radiation may be provided in order to compensate for the losses, as a result, a patient is also exposed to an increased radiation dose.

It is disadvantageous that an interaction location of incident radiation in the scintillator may not be detected or may be detected only with very great difficulty based on the radiation emerging at the rear side of the scintillator. It is not possible to obtain information about the height or depth of an interaction in the scintillator. Such disadvantages therefore restrict the resolution of an imaging system provided with such a detector construction.

For image intensification and for electron multiplication, it is furthermore known to use microchannel plates (MCP) having a number of channels. During operation, an electrical voltage present along the channels is generated, whereby entering electrons may be accelerated within the channels and multiplied by impacts with the channel walls. Use of a microchannel plate in connection with an image intensifier is described in US 2009/0256063 A1, for example.

SUMMARY AND DESCRIPTION

The scope of the present invention is defined solely by the appended claims and is not affected to any degree by the statements within this summary.

A solution for improved radiation detection in the medical field is specified.

A radiation detector includes a scintillator for generating electromagnetic radiation in response to the action of incident radiation. The scintillator has two mutually opposite end faces and a lateral wall between the end faces. The radiation detector also includes a photocathode section arranged on the lateral wall of the scintillator and serving for generating electrons in response to the action of the electromagnetic radiation generated by the scintillator, a microchannel plate having a plurality of channels for multiplying the electrons generated by the photocathode section, and a detection device for detecting the electrons multiplied by the microchannel plate.

During the operation of the radiation detector, with one of the end faces, the scintillator may face the radiation to be detected (e.g., X-ray or gamma radiation). The electromagnetic radiation (e.g., visible or ultraviolet light) generated by the incident radiation in the scintillator and passing to the lateral wall thereof may be taken up or absorbed directly by the photocathode section arranged at this location, and may thus be converted directly and rapidly into electrons. The lateral wall may have a relatively large surface area in comparison with the end faces of the scintillator. As a result of this, a large part of the radiation converted in the scintillator may be utilized for generating electrons. This holds true particularly in the case of one possible configuration of the scintillator having a high aspect ratio. On account of these properties, the radiation detector may be distinguished by a high temporal resolution and high efficiency.

It is advantageous that the radiation detector may have significantly less noise and a lower dark rate compared with a conventional detector including a silicon photomultiplier. This may be attributed to the fact that without radiation of the scintillator, no electrons are generated by the photocathode section and, consequently, no electron multiplication (e.g., substantially no electron multiplication) takes place in the microchannel plate. The microchannel plate used for electron multiplication may be embodied with a high porosity, as a result of which the microchannel plate has a high filling factor (e.g., ratio of active area to irradiated total area), which may be higher (e.g., significantly) than in the case of a conventional silicon photomultiplier. This likewise fosters a high efficiency of the radiation detector.

In one embodiment, the scintillator is embodied in a parallelepipedal fashion and has four lateral walls between the end faces. A photocathode section for generating electrons is arranged on each of the four lateral walls. As a result, a significant part of the electromagnetic radiation generated in the scintillator may be converted into electrons, which is advantageous for a high efficiency of the radiation detector.

This correspondingly applies to a further embodiment, according to which a further photocathode section for generating electrons is arranged on an end face of the scintillator.

In a further preferred embodiment, the radiation detector also includes an electrode arrangement for bringing about a movement of generated electrons to the microchannel plate. As a result, the electrons generated by the photocathode section(s) may be moved or accelerated reliably in the direction of the microchannel plate.

The electrode arrangement may include a first electrode, which is arranged in the region of an end face of the scintillator, and a second electrode, which is arranged on the microchannel plate. As a result, the radiation detector may have a relatively compact construction.

The second electrode may be embodied in the form of a structured layer and has openings via which channels of the microchannel plate are exposed. In this configuration, the electrons emitted by the photocathode section(s) may be accelerated to the second electrode and impinge on the second electrode with further electrons being liberated. Via the openings in the second electrode, the electrons may enter into the channels of the microchannel plate and be multiplied further here.

In a further embodiment, the microchannel plate is configured for multiplying electrons generated by different photocathode sections. For this purpose, the microchannel plate may, for example, be arranged in the region of an end face of the scintillator and be provided with larger lateral dimensions than the scintillator. In this way, electrons coming from different photocathode sections may pass to channels in different regions or segments of the microchannel plate, and may be multiplied here.

In a further embodiment, the detection device is configured for separately detecting electrons generated and multiplied by different photocathode sections. This affords the possibility of accurately detecting the lateral location of an interaction of a radiation quantum interacting with the scintillator. For this purpose, the detection device may, for example, be subdivided into different regions or segments. One or a plurality of trapping electrodes are arranged in each segment.

In a further embodiment, the scintillator, the microchannel plate, and the detection device are arranged one above another. As a result, a compact detector construction having small lateral dimensions may be made possible.

In a further embodiment, the radiation detector includes a first and a second photocathode section arranged in each case on a lateral wall of the scintillator and serving for generating electrons. The radiation detector also includes a first microchannel plate and a second microchannel plate for multiplying electrons. An electrode arrangement configured to bring about a movement of electrons generated by the first photocathode section to the first microchannel plate and electrons generated by the second photocathode section to the second microchannel plate is provided. The radiation detector includes a first detection device for detecting electrons multiplied by the first microchannel plate, and a second detection device for detecting electrons multiplied by the second microchannel plate. This configuration of the radiation detector affords the possibility of detecting the height or depth of an interaction in the scintillator. With regard to a parallelepipedal configuration of the scintillator having four lateral walls, for example, two of the photocathode sections adjoining (e.g., angularly adjoining) one another may constitute a first photocathode section, and the other two photocathode sections adjoining (e.g., angularly adjoining) one another may constitute a second photocathode section.

In a further embodiment, the radiation detector includes a number of a plurality of scintillators that are arranged alongside one another and on the lateral walls of which photocathode sections for generating electrons are arranged. A microchannel plate for multiplying electrons generated by photocathode sections of the plurality of scintillators, and a detection device for detecting electrons multiplied by the microchannel plate may also be provided. Such a modular configuration in which the microchannel plate and the detection device are assigned to the plurality of scintillators may be realized relatively cost-effectively, if appropriate.

Such a modular configuration also affords the possibility, with a corresponding electrode arrangement, of bringing about different movements of electrons emitted at lateral walls of the plurality of scintillators, and of assigning a first and second microchannel plate and a first and second detection device to the scintillators in a manner comparable to the embodiment described above.

An imaging system that includes a radiation detector in accordance with one of the embodiments described above, and in which, therefore, the advantages described above may likewise be manifested. Such an imaging system may be, for example, an X-ray or computed tomography system or else a positron emission tomography or single photon emission computed tomography system. With regard to such imaging systems, provision may be made for the above-described detector construction or one of the above-described embodiments to constitute in each case an individual detector element or a "pixel" of an associated detector, and for a number of such detector elements or "pixels" to be arranged alongside one another, for example, in a planar fashion and/or in a circular or partly circular fashion.

BRIEF DESCRIPTION OF THE DRAWINGS

FIG. 7 shows a schematic perspective illustration of exemplary components of a further detector element, configured to move electrons generated by different photocathode sections in different directions;

FIG. 8 shows a schematic plan view of one embodiment of an electrode arrangement used in the detector element from FIG. 7 for bringing about the different electron movements;

DETAILED DESCRIPTION

Embodiments of a detector or detector element that may be used to detect electromagnetic radiation (e.g., high-energy radiation such as X-ray or gamma radiation) are described with reference to the following figures. In order to produce the embodiments described, method processes known from the field of semiconductor and detector technology may be carried out and customary materials may be used, so the known method processes will be discussed only in part.

The detector concept described here is provided for use in association with imaging systems related to medical technology. In systems of this type, two- or three-dimensional image data of organs and structures of the human body are generated based on measurement signals obtained with the aid of a corresponding radiation detector.

Figure 1:
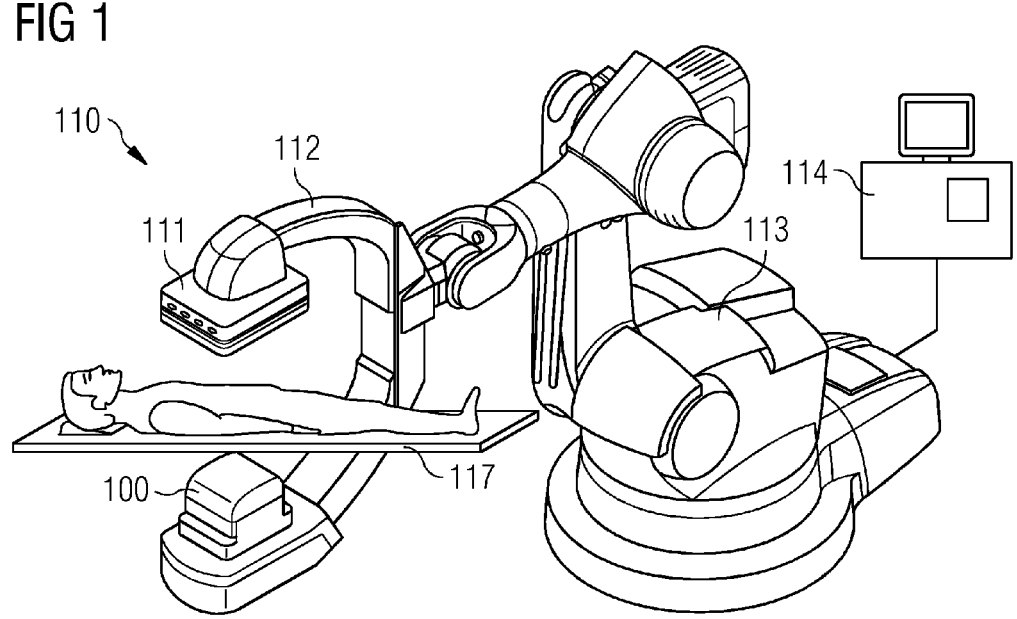
FIG. 1 shows a schematic illustration of one embodiment of an X-ray system.

For exemplary elucidation, FIG. 1 illustrates an X-ray system 110 that may be used for diagnostic and interventional imaging. The X-ray system 110 includes a radiation source 111 for emitting X-ray radiation ("X-ray emitter") and an associated detector 100 of planar construction ("flat detector") for detecting the radiation. Radiation source 111 and detector 100 are arranged opposite one another at the ends of a C-shaped holding device 112. On account of this configuration, this arrangement is also designated as "C-arc" or "C-arm".

A patient to be examined is situated on a patient supporting couch 117 and in this case is arranged between radiation source 111 and detector 100. During the operation of the X-ray system 110, the body or a body section of the patient is radiographed with the X-ray radiation generated by the radiation source 111, and the non-absorbed, transmitted portion of radiation is detected by the detector 100.

The holding device 112 is also fixed to a robot 113 provided with a plurality of axes and/or articulations. The radiation source 111 and the detector 100 may be brought to a desired position in relation to the patient with the aid of the robot 113. For controlling the X-ray system 110 and for processing and/or evaluating measurement signals of the detector 100 (e.g., for generating the desired image data), the X-ray system 110 also includes a control and/or evaluation device 114. The control and/or evaluation device 114 is connected to a corresponding display device or a display, as is indicated in FIG. 1.

Alongside the X-ray system 110 from FIG. 1, the detector concept described below may also be used in association with other imaging systems (not illustrated). By way of example, systems including a gantry, such as a computed tomography system (CT), for example, are appropriate. Such a system may include an annular or circular-cylindrical detector and a rotatable X-ray source. Further exemplary applications with a gantry include positron emission tomography systems (PET) and single photon emission computed tomography systems (SPECT). In this case, the patient to be examined is injected with a radiopharmaceutical that generates gamma quanta either directly (SPECT) or indirectly (PET) through emission of positrons. The quanta may be detected likewise by an annular or circular-cylindrical detector.

Figure 2:
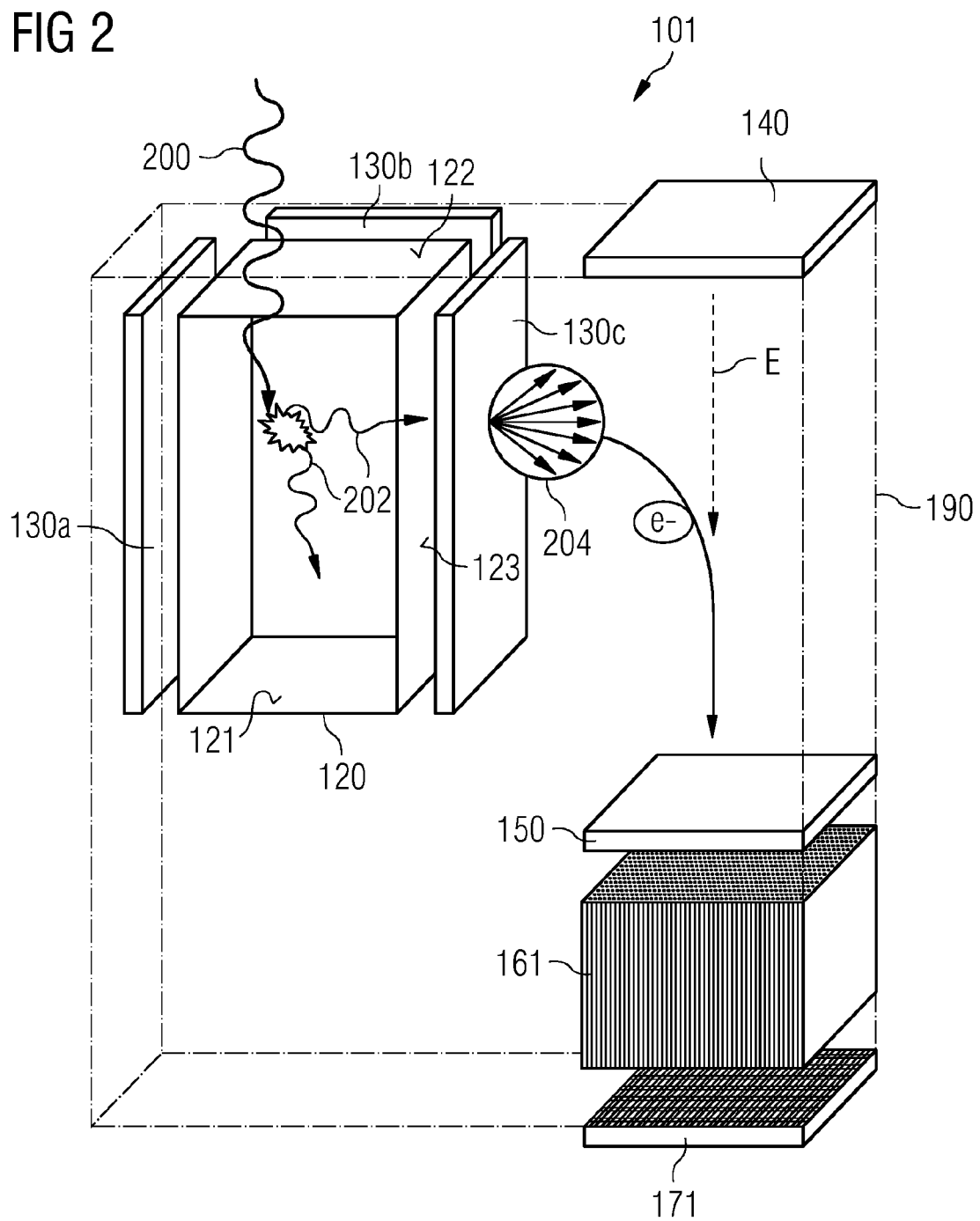
FIG. 2 shows a schematic perspective illustration of exemplary constituent parts of a detector element including photocathode sections on lateral walls of a scintillator.

FIG. 2 shows a schematic perspective illustration of a basic construction of a detector element 101 that may be used for detecting incident high-energy radiation. The embodiments of detector elements described further below with reference to the other figures are constructed based on the detector principle shown here, and the aspects described below may also apply to these embodiments. A radiation detector of an imaging system (e.g., the detector 100 of the system 110 from FIG. 1) may include a number of detector elements constructed in this way. The detector elements may be arranged alongside one another in the form of "pixels" in a matrix-like manner. In this case, for example, planar, but also annular or partly annular arrangements may be present. The image data respectively desired may be generated based on the measurement signals generated by the individual pixels or detector elements of a detector.

As is illustrated in FIG. 2, the detector element 101 includes a scintillator 120 that serves to convert the high-energy radiation to be detected into a low(er)-energy radiation. The scintillator 120 is embodied in a parallelepipedal fashion and has two mutually opposite end faces 121, 122 and four lateral walls 123 between the two end faces 121, 122. The lateral walls adjoin one another at a right angle. The end face 122 directed toward the top in FIG. 2 is also designated hereinafter as "front side," and the end face 121 directed toward the bottom is designated as "rear side" of the scintillator 120. Front and rear sides 122, 121 are connected to one another via the lateral walls 123 at the periphery or edge.

As indicated in FIG. 2, the scintillator 120 has a high aspect ratio (e.g., a high ratio of height (distance between the end faces 121, 122) to width (lateral dimension or distance between two mutually opposite lateral walls 123)), which is greater or significantly greater than one. In this way, a high absorption of the high-energy radiation may be detected, which is indicated based on a radiation quantum 200 in FIG. 2, in the scintillator 120. In this connection, the components illustrated in FIG. 2, but also in the other figures, and corresponding dimensions may be illustrated in a manner not true to scale. By way of example, the scintillator 120 may have a larger height or a larger aspect ratio.

During the operation of the detector element 101, the front side 122 of the scintillator 120 faces the radiation to be detected, such that the radiation may be incident or coupled into the scintillator 120 via the front side 122. A radiation quantum 200 (e.g., X-ray quantum or gamma quantum) of the incident radiation may bring about an excitation locally upon passing through the scintillator 120. The excitation energy deposited or absorbed during this process is reemitted by the scintillator 120 in the form of lower-energy radiation quanta or photons 202. In this case, the number of emitted photons 202 may be proportional to the original energy of the radiation quantum 200 that interacts with the scintillator material. The scintillation mechanism that takes place in this case will not be discussed in more specific detail. The scintillation radiation generated by the scintillator 120 may be visible or ultraviolet light, for example.

Alongside radiation emission in the direction of the end faces 121, 122 of the scintillator 120, a large part of the scintillation radiation or photons 202 generated in the scintillator 120 is emitted in the direction of the lateral walls 123. This is the case, for example, if the scintillator 120, as in the present case, has a high aspect ratio, and, consequently, the lateral walls 123 have a relatively large surface area in comparison with the end faces 121, 122 of the scintillator 120. In the case of the detector element 101, provision is made for utilizing, for example, this significant portion of radiation at the lateral walls 123 for detecting radiation. As a result of this, a high efficiency may be achieved.

The detector element 101 includes for this purpose a respective photocathode section 130 on all four lateral walls 123, by which photocathode sections photons 202 emitted to the lateral walls 123 and emerging at the lateral walls 123 may be converted into electrons 204 (e.g., photoelectrons) with use being made of the photoelectric effect. For each photon 202 that impinges on a photocathode section 130 and is absorbed here, the relevant photocathode section 130 may emit an electron 204.

For reasons of clarity, only three photocathode sections 130 provided on lateral walls 123 are illustrated in FIG. 2. The sections are also provided with the reference signs 130a, 130b and 130c for differentiation. These reference signs in part are also used in the other figures. In this case, the addition "a" refers to the section 130 arranged on the left, the addition "b" refers to the section 130 offset toward the rear with respect to the plane of the drawing, and the addition "c" refers to the section 130 arranged on the right. In the other figures, by contrast, the designation "d" is provided for a fourth photocathode section 130 that is not shown in FIG. 2 and is arranged at the front in the plane of the drawing.

Each of the photocathode sections 130, in a departure from the spaced-apart illustration of FIG. 2, is arranged directly on a respective lateral wall 123 of the scintillator 120. The layer-type photocathode sections 130 may have substantially the same surface area as the relevant lateral walls 123, such that all lateral walls 123 are substantially completely covered by the photocathode sections 130. In this case, the photocathode sections 130 may be present in the form of a continuous layer (e.g., peripherally) enclosing the scintillator 120.

The photocathode sections 130 constitute semitransparent photocathodes or transmission photocathodes that operate transmissively. In this case, the photocathode sections 130 are irradiated at the side facing the scintillator 120 or bearing on the lateral walls 123 thereof, and electrons 204 are emitted at an opposite side of the photocathode sections 130 with respect thereto. This is elucidated in FIG. 2 with the aid of the right-hand photocathode section 130c. The direct arrangement of the photocathode sections 130 on the lateral walls 123 of the scintillator 120 likewise contributes to the high efficiency of the detector element 101. What may be achieved in this configuration is that the scintillation radiation passing to the lateral walls 123 and emerging at the lateral walls 123 is directly taken up or absorbed by the photocathode sections 130 and converted into electrons 204. Radiation reflection and the situation where the radiation is "reflected back and forth" in the scintillator 120, associated with corresponding loss processes, may be avoided (e.g., largely avoided) in this case. To put it another way, the first "contact" of a photon 202 with a lateral wall 123 may lead to the generation of an electron 204.

The configuration of the scintillator 120 with the photocathode sections 130 on the lateral walls 123 thus affords the possibility of obtaining rapid access to a large number of scintillation photons 202 by an extremely short route. In this way, the detector element 101 may have a high efficiency and a high temporal resolution. These advantages correspondingly also hold true for a detector constructed from a plurality of such detector elements 101, and thus for an associated imaging system. This affords the possibility, for example, of exposing a patient to be examined only to a low radiation dose.

Alongside the scintillator 120 and the photocathodes 130 arranged thereon, the detector element 101 also includes an arrangement composed of two electrodes 140, 150, a microchannel plate 161 having a multiplicity of microchannels, and a detection device 171. With the aid of the two electrodes 140, 150, an electric field E is generated in order to bring about a movement of the electrons 204 generated photoelectrically at the lateral walls 123 of the scintillator 120 to the microchannel plate 161. This is likewise elucidated in FIG. 2 only with the aid of the right-hand lateral wall 123 provided with the photocathode section 130c. In this case, the electrode 140 may constitute a cathode, and the other electrode 150 may constitute an associated anode or dynode, on which the electrons 204 may impinge with further electrons 204 being liberated. The electrodes 140, 150 may also be embodied and positioned with respect to one another such that the direction of the electric field E runs parallel to the longitudinal axis of the scintillator 120.

In order that the electrons 204 may pass to the microchannel plate 161 arranged below the electrode 150, the electrode 150 may be provided with corresponding openings (not illustrated in FIG. 2). The electrode 150 (in a departure from the illustration of FIG. 2) may be arranged directly on the microchannel plate 161. The electrons 204 passing to the microchannel plate 161 may be rapidly multiplied in the channels thereof and subsequently trapped and detected with the aid of the detection device 171 arranged below the microchannel plate 161, or with the aid of one or more readout electrodes (e.g., "readout pad") provided and serving as anodes. A corresponding output signal may be generated based on this. The detection device 171 may (in a departure from the illustration in FIG. 2) be directly connected to the microchannel plate 161. These and further possible details concerning the components 140, 150, 161, 171 and the functioning thereof will be discussed even more thoroughly in connection with FIGS. 3 and 4.

The above-described functioning of the detector element 101 requires the presence of an evacuated atmosphere or a vacuum at least in that region in which free electrons 204 are present (e.g., starting from the generation at the lateral walls 123 of the scintillator 120 with the photocathode sections 130 through to detection with the aid of the detection device 170). In FIG. 2, and also in the further figures, the presence of such an evacuated environment or a vacuum 190 is indicated with the aid of broken lines. The provision of the evacuated environment 190 may be made possible, for example, with a corresponding housing (not illustrated).

Figure 3:
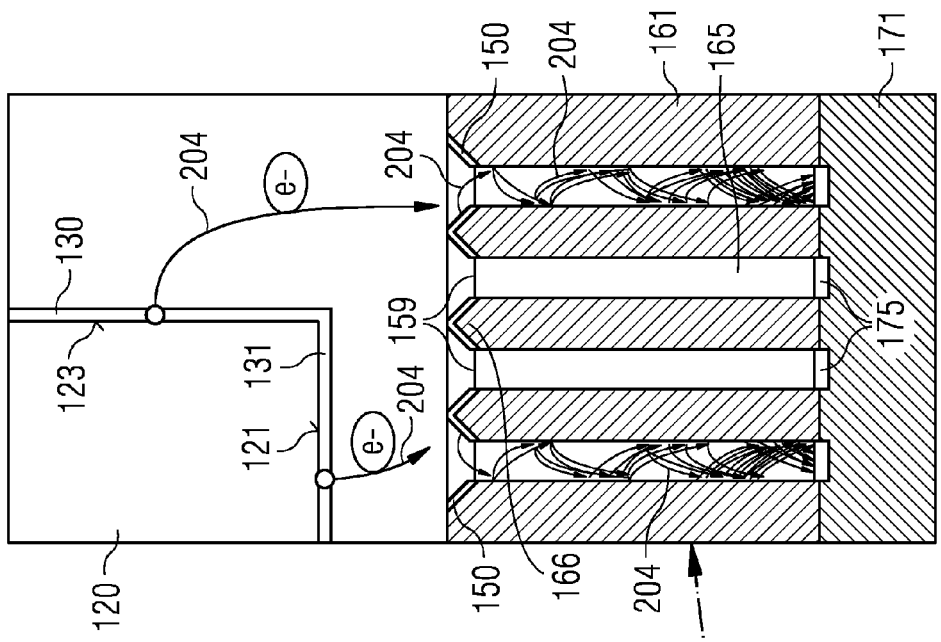
FIG. 3 shows a schematic perspective illustration of a further embodiment of a detector element constructed in accordance with the components from FIG. 2.
Figure 4:
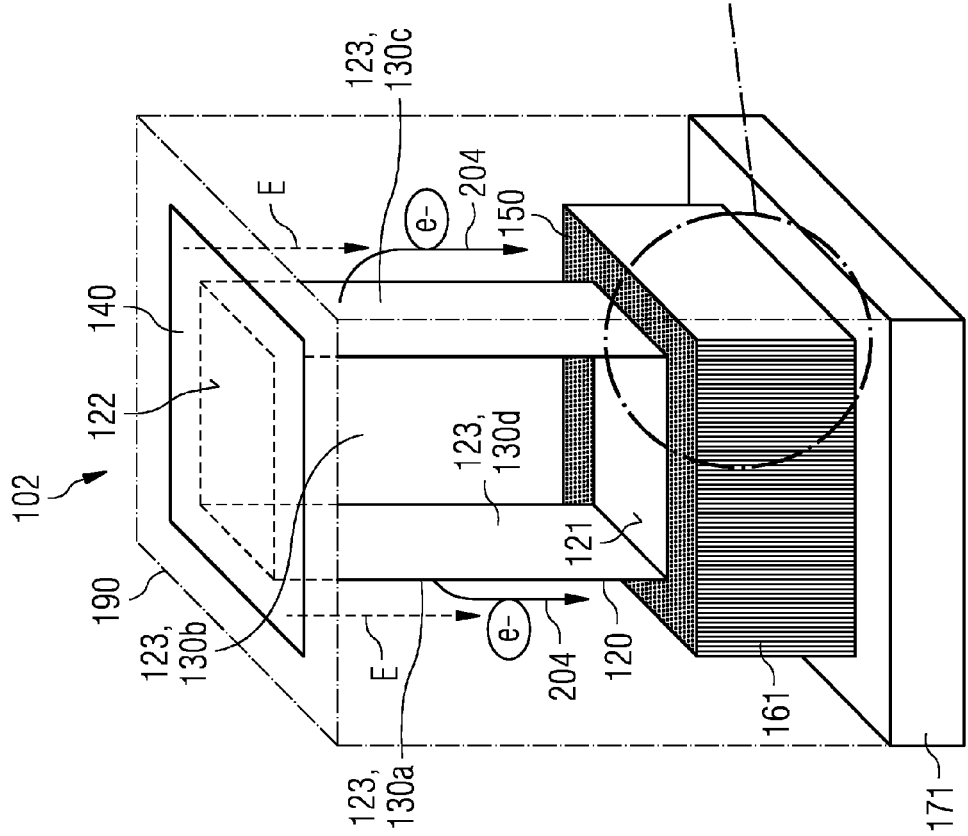
FIG. 4 shows a schematic lateral illustration of an enlarged excerpt from the detector element from FIG. 3.

FIG. 3 shows a schematic perspective illustration of one embodiment of a detector element 102 constructed from the constituent parts described above. FIG. 4 shows a schematic lateral illustration of an enlarged excerpt from the detector element 102, based on which further possible details of the detector element 102 become clear. As is illustrated in FIG. 3, the electrode 140, the scintillator 120 coated with the photocathodes 130, the other electrode 150, the microchannel plate 161 and the detection device 171 are arranged one above another with respect to one another in the case of the detector element 102. In this way, the detector element 102 may have a relatively compact construction with small lateral dimensions.

The electrode 140, which may be embodied in the form of a rectangular or square plate, is arranged in the region of the front side 122 or on the front side 122 of the parallelepipedal scintillator 120. The other electrode 150, as shown in FIG. 4, is embodied in the form of a structured layer arranged on a side of the microchannel plate 161 situated opposite the rear side 121 of the scintillator 120. This side of the microchannel plate 161 is also designated hereinafter as the "front side" of the microchannel plate 161. Both electrodes 140, 150 extend substantially parallel to one another, as illustrated in FIG. 3, and project laterally beyond the lateral walls 123 of the scintillator 120 (or planes predefined by the lateral walls 123). The two electrodes 140, 150 may have the same or comparable external dimensions.

As a result of the parallel arrangement of the electrodes 140, 150 and the lateral projection thereof beyond the lateral walls 123 of the scintillator 120, an electric field E generated with the aid of the two electrodes 140, 150 runs also laterally with respect to the lateral walls 123 parallel to the longitudinal axis of the scintillator 120. Using the electric field E, electrons 204 emitted at the lateral walls 123 by the photocathode sections 130 or 130a, 130b, 130c, 130d in response to the action of the scintillation radiation may be reliably deflected toward the electrode 150 and accelerated in the direction of the electrode 150. For the generation of the electric field E, corresponding electrical potentials coordinated with one another are applied to the two electrodes 140, 150. For this purpose, the detector element 102 includes a suitable connection structure (not illustrated). The potential difference between the electrodes 140, 150 may be in the high-voltage range, for example.

The microchannel plate 161 arranged on the rear side 121 of the scintillator 120 or situated opposite the rear side 121 has a plate-shaped main body permeated by a plurality (e.g., a few thousand) of microscopically fine channels 165 (see FIG. 4). The channels 165 can be arranged with a close pitch in a pixel-like manner with respect to one another and may be embodied in a manner running parallel to one another. The microchannel plate 161, in a manner comparable with the two electrodes 140, 150, likewise has larger lateral dimensions than the scintillator 120 and extends laterally beyond the lateral walls 123 thereof (or planes predefined by the lateral walls 123). As a result of this, electrons 204 emitted by the lateral walls 123 may pass to the microchannel plate 161 and be multiplied therein.

The front side of the microchannel plate 161 "coated" with the electrode 150 may be arranged at a distance from the rear side 121 of the scintillator 120, as shown in FIG. 4, at least in the region illustrated here. In a departure from this, provision may be made for scintillator 120 and microchannel plate 161 to directly adjoin one another at one or a plurality of other locations, such that the scintillator 120 is placed on the front side of the microchannel plate 161. For this purpose, the microchannel plate 161 may have at the front side, for example, one or more projecting supporting structures or spacer structures on which the scintillator 120 may bear (not illustrated). At such supporting locations, no coating of the microchannel plate 161 with the electrode 150 is provided.

With reference to FIG. 4, the electrode 150 arranged on the front side of the microchannel plate 161 is embodied in the form of a structured layer and has holes or openings 159. The channels 165 of the microchannel plate 161 are exposed via the openings 159, such that electrons 204 may enter into the channels 165 at the front side of the microchannel plate 161. The microchannel plate 161 is also provided with a structured surface profile at the front side, and has elevations 166 between the channels 165 with a shape or contour decreasing in size (e.g., trapezoidal or tetrahedral shape). In this way, the electrode 150 arranged here likewise has a correspondingly structured or profiled surface shape having, for example, trapezoidal or tetrahedral sections tapering, for example, obliquely toward one another. This configuration makes it possible that electrons 204 (e.g., primary electrons) emitted by the photocathode sections 130 in the direction of the electrode 150 may impinge on the electrode 150 and may eject or liberate further electrons 204 (e.g., secondary electrons) here. The electrons 204 may subsequently enter into the channels 165 of the microchannel plate 161 via the openings 159 and may be multiplied further, as indicated in FIG. 4.

For this purpose, during the operation of the detector element 102, likewise an electrical voltage (e.g., high voltage) is applied between the front side and a rear side of the microchannel plate 161 situated opposite the front side. As a result of this, an electric field is present along the channels 165. Electrons 204 entering into a channel 165 at the front side of the microchannel plate 161 are moved or accelerated owing to the electric field in the direction of the rear side of the microchannel plate 161 and thus in the direction of the detection device 171 provided in this region. In this case, the small lateral dimensions of the channels 165 have the effect that the electrons 204 may multiply impact the wall of the relevant channel 165 during this movement. Upon each impact, further electrons 204 may be released or ejected from the channel wall and for their part, may likewise be accelerated within the channel 165 and liberate further electrons 204 as a result of impacts with the channel wall. This process continues over the length of the channel 165 and is therefore associated with an avalanche- or cascade-like increase in electrons 204, as illustrated in FIG. 4.

The electrons 204 multiplied in accordance with this process in the channels 165 of the microchannel plate 161 impinge on the detection device 171 at the rear side of the microchannel plate 161 and are detected by the detection device. In this case, the detection device 171 may generate a corresponding electrical output signal (e.g., voltage drop across a resistor). Such an output signal is dependent on the number or total charge of the electrons 204 collected in the detection device 171, and thus on the excitation energy originally deposited in the scintillator 120.

The detection device 171 may have larger lateral dimensions than the microchannel plate 161, as shown in FIG. 3. The detection device 171, as illustrated in FIG. 4, may be connected to the microchannel plate 161 or to the rear side thereof and includes, per channel 165, a respective corresponding electrode 175 for trapping or collecting multiplied electrons 204. Alternatively, the detection device 171 may be provided with larger or wider electrodes that are assigned to a plurality of channels 165. A configuration having an individual or large-area electrode for trapping the electrons 204 multiplied in all the channels 165 of the microchannel plate 161 may also be provided.

The presence of an acceleration voltage and thus of an electric field along the channels 165 of the microchannel plate 161 requires the application of corresponding electrical potentials to the front and rear side thereof. At the front side of the microchannel plate 161, this may be effected by the electrode 150 arranged here. With regard to the rear side, this may be performed with the aid of the detection device 171 or the electrode(s) 175 thereof.

As is illustrated in the enlarged excerpt illustration in FIG. 4, the detector element 102 includes, alongside the photocathode sections 130 provided on the lateral walls 123 of the scintillator 120, a further (optional) semitransparent photocathode section 131 arranged on the rear side 121 of the scintillator 120. In this case, all the photocathode sections 130, 131 may be present in the form of a continuous coating of the scintillator 120. The photocathode section 131 affords the possibility of additionally utilizing a portion of the scintillation radiation generated in the scintillator that passes to the rear side 121 and of directly converting this into photoelectrons 204. Using the electric field E that is also present in this region, is produced with the aid of the electrodes 140, 150, and is oriented parallel to the longitudinal axis of the scintillator 120, the electrons 204 emitted at the rear side 121 may likewise be accelerated in the direction of the electrode 150. This may be followed once again by the processes described above (e.g., impingement of the electrons 204 on the electrode 150 with liberation of further electrons 204, entry of the electrons 204 into channels 165 of the microchannel plate 161 and multiplication of the electrons, and detection of the multiplied electrons 204 with the aid of the detection device 171). For further details in this regard, reference is made to the description above. With regard to details pertaining to the photocathode section 131, reference is made to the above explanations concerning the other photocathode sections 130, which apply analogously here.

Alongside the above-described utilization of the scintillation radiation emitted, for example, to the lateral walls 123 of the scintillator 120, the use of the microchannel plate 161 used for electron multiplication also contributes to a high detection efficiency. For example, the detector element 102 and 101 may have a low noise proportion and a low dark rate. This is owing to the fact that the production of electron avalanches in the channels 165 of the microchannel plate 161 and thus the generation of a corresponding signal in the detection device 171 take place substantially only if the scintillator 120 emits radiation and the photocathode sections 130, 131 generate photoelectrons 204 in response to the action of the scintillation radiation. The microchannel plate 161 may be embodied with small distances between the microchannels 165, and consequently with a high porosity. This is associated with a high filling factor, which may be significantly higher than in the case of a conventional silicon photomultiplier.

Materials known from semiconductor and detector technology may be used for the constituents of the detector element 102 and 101. By way of example, the electrodes 140, 150 are formed from an electrically conductive or metallic material. The electrode 150 arranged on the microchannel plate 161 may include a material having high secondary electron emission. As a result of this, the impingement of photoelectrons 204 on the electrode 150 may be associated with liberation of a number of further electrons 204 and thus high electron multiplication.

The use of an inorganic material or of a crystal is considered for the scintillator 120. In one embodiment, this involves a "fast" scintillator 120, in which the scintillation mechanism (e.g., the conversion of the incident high-energy radiation into the lower-energy scintillation radiation) takes place in a short time duration. One material considered for this purpose is CsF or LSO, for example. With regard to a possible size of the scintillator 120, consideration is given, for example, to lateral dimensions or a width in the range of a few 100 μm to a few mm, and a height in the range of a few mm to a few 10 mm. In this case, the scintillator 120 has an aspect ratio of greater (e.g., significantly greater) than one, which may be greater than 7:1, for example, with regard to PET applications.

Materials such as, for example, CsI, CsTe, Cs3Sb, diamond and GaN are appropriate for the photocathode sections 130, 131. The photocathode sections 130, 131 and the scintillator 120 or the materials thereof are in this case coordinated with one another such that the scintillation radiation coming from the scintillator 120 may be converted into free electrons 204 in the photocathode sections 130, 131. Since the photocathode sections 130, 131 operate transmissively, as described above, the photocathode sections 130, 131 are also embodied with a relatively small thickness or layer thickness (e.g., in the range of a few 10 nm) on the scintillator 120.

The microchannel plate 161 may include a semiconductor material such as silicon, for example. In this way, the microchannel plate 161 may be produced in a simple manner (e.g., with the aid of a lithographic patterning and etching method). The microchannel plate 161 may also be embodied such that the microchannel plate 161, alongside a basic or starting material (e.g., a semiconductor material such as silicon) also includes even further materials or layers (not illustrated). By way of example, a coating having high secondary electron emission may be provided within the channels 165 in order to be able to liberate a multiplicity of further electrons 204 in the event of wall impacts of electrons 204. The microchannel plate 161, which (like the electrodes 140, 150) has larger lateral dimensions than the scintillator 120, may have, for example, a height (distance between front and rear sides) in the range of a few 100 μm to a few mm. The pores or channels 165 of the microchannel plate 161 may have a width or a diameter of a few μm to a few 10 μm.

With regard to the channels 165, provision may also be made for the channels, contrary to the illustration in FIG. 4, to be arranged in a manner obliquely tilted relative to a normal to a plane predefined by the microchannel plate 161 (or by the front side and/or rear side thereof). In this case, for example, an angle in a range of 10° between the normal to the plate and a longitudinal axis of the channels 165 may be provided. What may be achieved as a result is that the electrons 204 multiply impact the channel walls independently of their entrance angles upon entering into the channels 165 and, consequently, may liberate further electrons 204.

A series of different configurations may be provided for the detection device 171 as well. The detection device 171, which, as shown in FIG. 3, may have larger lateral dimensions than the microchannel plate 161, may be embodied, for example, like the microchannel plate 161 in the form of a semiconductor or silicon substrate with one or more electrodes 175 composed of a conductive or metallic material. In this way, a bonding method known from semiconductor technology may be carried out in order to connect these two components 161, 171. Alternatively, the detection device 171 may also be embodied, for example, in the form of a ceramic carrier provided with one or more electrodes 175.

In a configuration of the detection device 171 having a plurality of electrodes 175, the plurality of electrodes 175 may be present, for example, in the form of rows and columns or in the form of a matrix arrangement. Alternatively, however, other configurations of electrodes may be provided (e.g., in the form of crossed striplines or strip-shaped electrodes ("transmission line system")).

The detection device 171 may also be present in the form of an application specific integrated circuit (ASIC). In this way, the detection device 171 may be configured not only for detecting or reading out a total charge of an electron avalanche and for generating an output signal on the basis thereof, but also for at least partly conditioning or evaluating the same.

One possible modification of the detector element 102 in FIGS. 3 and 4 consists in providing photocathode sections 130 for photoelectrically generating electrons 204 only on the lateral walls 123 of the scintillator 120, and omitting the photocathode section 131 arranged on the rear side 121 of the scintillator 120. In this way, the configurations that are described below and are not illustrated may also be considered. This may be realized either jointly or (if appropriate) independently of one another. By way of example, the possibility is afforded that, instead of a whole- or large-area coating of the microchannel plate 161 with the electrode 150, the electrode 150 is formed only in a frame-shaped region (e.g., laterally with respect to the lateral walls 123 of the scintillator 120) on the front side of the microchannel plate 161, since photoelectrons 204 are only emitted by the lateral walls 123. A frame-shaped configuration is equally possible for the other electrode 140. The microchannel plate 161 may be provided with channels 165 only in a frame-shaped region corresponding to the frame-shaped electrode 150. The same applies to the detection device 171, which may likewise include one or a plurality of trapping electrodes 175 only in a frame-shaped region. The scintillator 120 may also be placed directly on the microchannel plate 161 over the entire rear side 121, and therefore (in a departure from FIG. 4), there is no distance between the scintillator 120 and the microchannel plate 161.

Further possible configurations of detector elements are described with reference to the following figures. In this case, with regard to already described details relating to aspects and components of identical type or corresponding aspects and components, functioning, usable materials, size dimensions, possible advantages, etc., reference is made to the above explanations.

Figure 5:
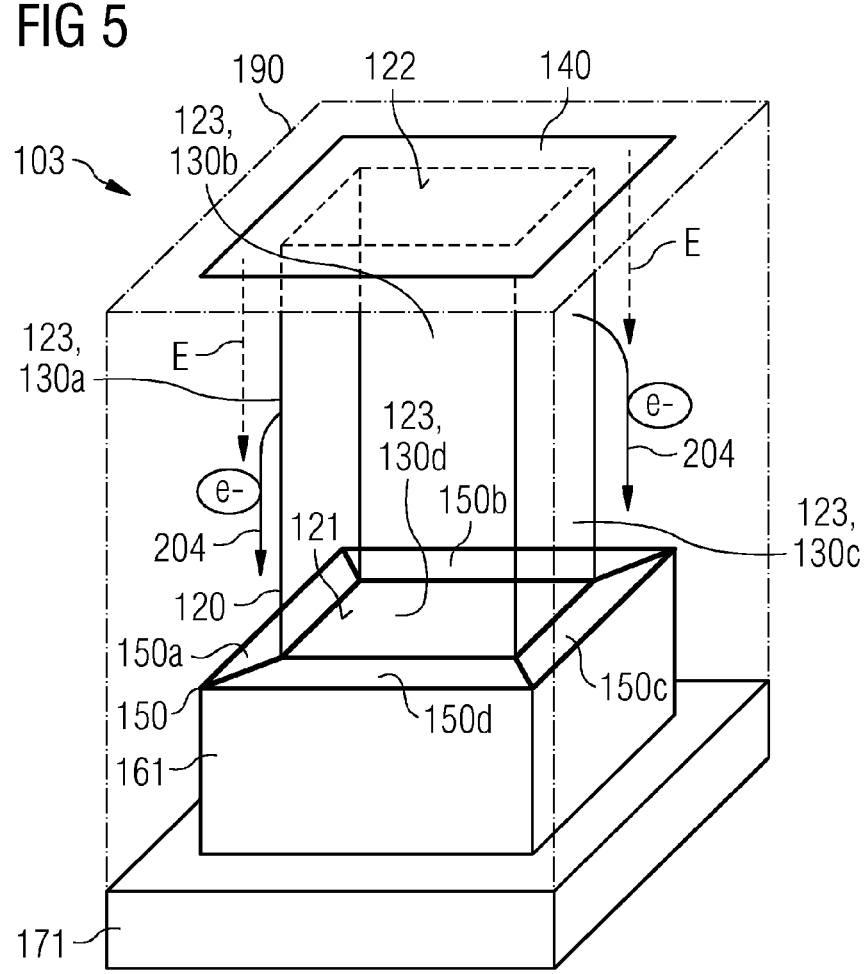
FIG. 5 shows a schematic perspective illustration of a further detector element, configured for segment-by-segment detection of electrons, where the electrons are generated by different photocathode sections.

FIG. 5 shows a schematic perspective illustration of a further embodiment of a detector element 103 that is constructed in a manner comparable with the detector element 102 from FIG. 3. The detector element 103 or the detection device 171 thereof is configured to detect electrons 204 separately from one another. The electrons are generated and subsequently multiplied with the aid of different photocathode sections 130 arranged on lateral walls 123.

In order to elucidate this functioning, FIG. 5 indicates a subdivision of the electrode 150 into trapezoidal electrode regions or segments 150a, 150b, 150c, 150d that are present laterally with respect to the lateral walls 123 of the scintillator 120. The electrode 150 (in a manner corresponding to FIG. 4) may be formed on the microchannel plate 161 and with openings 159. The individual segments 150a, 150b, 150c, 150d are assigned to the photocathode sections 130a, 130b, 130c, 130d arranged on the different lateral walls 123 of the scintillator 120. The shown subdivision of the electrode 150, which may be merely fictitious, is intended to elucidate the fact that the electrons 204 emitted at the different lateral walls 123 may be deflected to the different segments or quadrants 150a, 150b, 150c, 150d on account of the electric field E generated by the electrodes 140, 150 and situated parallel to the longitudinal axis of the scintillator 120. In this case, electrons 204 are accelerated from the photocathode section 130a to the segment 150a, from the photocathode section 130b to the segment 150b, from the photocathode section 130c to the segment 150c, and from the photocathode section 130d to the segment 150d.

In a corresponding manner, the electrons 204 that impinge on the different segments 150a, 150b, 150c, 150d and are liberated here are multiplied separately from one another or in corresponding fictitious segments of the microchannel plate 161. This makes it possible for the multiplied electrons 204 also to be detected separately from one another by the detection device 171 arranged (in a manner corresponding to FIG. 4) on the rear side of the microchannel plate 161.

Figure 6:
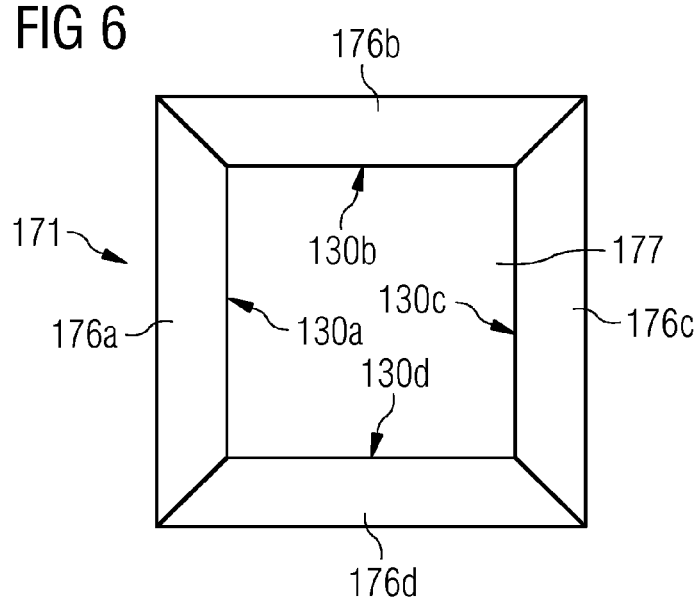
FIG. 6 shows a schematic plan view of one embodiment of an electrode arrangement of a detection device used in the detector element from FIG. 5.

For this purpose, the detection device 171 includes separate electrode regions 176a, 176b, 176c, 176d, as illustrated with reference to the schematic plan view illustration in FIG. 6. The electrode regions 176a, 176b, 176c, 176d are assigned to the individual lateral walls 123 of the scintillator 120 or to the photocathode sections 130a, 130b, 130c, 130d and thus to the "multiplying segments" of the microchannel plate 161 and to the electrode regions 150a, 150b, 150c, 150d of the electrode 150. The electrode regions 176a, 176b, 176c, 176d may therefore be embodied in a trapezoidal fashion. Each electrode region 176a, 176b, 176c, 176d may in each case have a large-area electrode, or else a plurality of electrodes (e.g., in a manner corresponding to the structure shown in FIG. 4). The electrons 204 generated and multiplied separately from one another may be detected separately via the electrode regions 176a, 176b, 176c, 176d. Using this as a basis, corresponding output signals may be generated using the charge quantities detected by the individual electrode regions 176a, 176b, 176c, 176d.

The separate and segment-by-segment detection of electrons 204 generated and multiplied by different photocathode sections 130a, 130b, 130c, 130d affords the possibility of determining, simply and accurately, the lateral location of the interaction ("x/y position") of a radiation quantum 200 that excites the scintillator 120 in the scintillator 120. In this case, it is possible to make use of the fact that the point in time or the temporal development and/or the magnitude of the charge signals obtained by the electrode regions 176a, 176b, 176c, 176d are/is dependent on the proximity of the interaction to the respective lateral walls 123. In order to determine the lateral interaction location, summation and/or difference signals may, for example, be formed from the individual signals. For example, in the case of one possible configuration of the detection device 171 in the form of an ASIC circuit, this may be carried out by the detection device 171 itself.

Making it possible to determine a lateral interaction location in a scintillator 120 proves to be expedient for an imaging system in which the associated detector is constructed from a plurality of detector elements 103 constructed in this way. Alongside a high efficiency and a high temporal resolution, the relevant detector may have a high lateral spatial resolution as a result even in the case of relatively large lateral scintillator dimensions.

In the case of the detector element 103 as well, in a manner comparable with the detector element 102, an optional photocathode section 131 may be provided on the rear side 121 of the scintillator 120, such that an arrangement as shown in FIG. 4 may be present. In a corresponding manner, the electrons 204 emitted at the rear side 121 may be accelerated to a rectangular region of the electrode 150 enclosed by the segments 150a, 150b, 150c, 150d, may impinge here with further electrons 204 being liberated, and the electrons 204 may once again be multiplied separately (e.g., separately from the electrons 204 of the other segments 150a, 150b, 150c, 150d) in the microchannel plate 161. These electrons 204, too, may be detected separately by the detection device 171. For this purpose, the detection device 171 may have an optional rectangular electrode region 177 enclosed by the electrode regions 176a, 176b, 176c, 176d, as is indicated in FIG. 6.

The "central" electrode region 177, like the other electrode regions 176a, 176b, 176c, 176d, may have a large-area electrode or else a plurality of electrodes for detecting multiplied electrons 204.

In the case of the detector elements 102, 103 described above, the arrangement including microchannel plate 161 (e.g., with electrode coating 150) and detection device 171 is provided in the region of the rear side 121 of the scintillator 120. Alternatively, however, a configuration of the detector elements 102, 103 that is symmetrical thereto may also be provided. The arrangement including microchannel plate 161 and detection device 171 is provided in the region of the front side 122 of the scintillator 120. In this configuration, the electrode 140, serving as cathode, is arranged at or on the rear side 121 of the scintillator 120, and an optional photocathode section 131 is arranged on the front side 122 of the scintillator 120. In this case, the high-energy radiation to be detected may be transmitted (e.g., without interaction) through the detection device 171, the microchannel plate 161 (e.g., including the electrode 150), and the optional photocathode section 131 and may subsequently be incident in the scintillator 120. The processes described above may once again occur.

A further possible variant includes providing microchannel plates and detection devices on different sides (e.g., on the two end faces 121, 122 of the scintillator 120), and bringing about electron movements in different or mutually opposite directions. This affords the possibility of also detecting the height or depth of an interaction in the scintillator 120. One possible configuration will be explained in greater detail with reference to the following figures.

FIG. 7 shows a schematic perspective illustration of exemplary constituent parts of a further detector element 104. Alongside the parallelepipedal scintillator 120, on the four lateral walls 123 of which respective photocathode sections 130a, 130b, 130c, 130d are arranged for photoelectrically generating electrons 204, the detector element 104 has a mirror-symmetrical electrode arrangement for bringing about different electron movements.

The electrode arrangement includes two L-shaped electrodes 141, 142 in the region of the front side 122 of the scintillator 120, and two further L-shaped electrodes 151, 152 in the region of the rear side 121 of the scintillator 120. In this case, the two electrodes 141, 142, which project laterally beyond the edge of the front side 122 of the scintillator 120 or are present at least in a region laterally with respect to the lateral walls 123, form a frame-shaped structure. In the same way, the other two electrodes 151, 152, which project laterally beyond the edge of the rear side 121 of the scintillator 120 or are present at least in a region laterally with respect to the lateral walls 123, likewise form a frame-shaped structure.

Both the electrodes 141, 151 and the electrodes 142, 152 are arranged parallel to one another and one above another. The electrode pair 141, 151 is arranged in the region of the photocathode sections 130a, 130d, and the other electrode pair 142, 152 is arranged in the region of the photocathode sections 130b, 130c. This relationship is also illustrated in the schematic plan view illustration in FIG. 8.

As is also indicated in FIG. 7, an electric field E in the direction of the bottom electrode 151 may be produced by the two electrodes 141, 151 situated opposite one another. The electrode 141 may constitute a cathode, and the other electrode 151 may constitute an anode or dynode. In this way, the electrons 204 generated by the photocathode sections 130a, 130d may be accelerated downward in the direction of the electrode 151. By contrast, an electric field E in the opposite direction (e.g., in the direction of the top electrode 142) may be produced by the other two electrodes 142, 152 situated opposite one another. The electrode 152 may constitute a cathode, and the other electrode 142 may constitute an anode or dynode. In this way, the electrons 204 emitted by photocathode sections 130b, 130c may be accelerated upward in the direction of the electrode 142. The electric fields E generated by the electrode pairs 141, 151 and 142, 152 are once again oriented parallel to the longitudinal axis of the scintillator 120.

Figure 9:
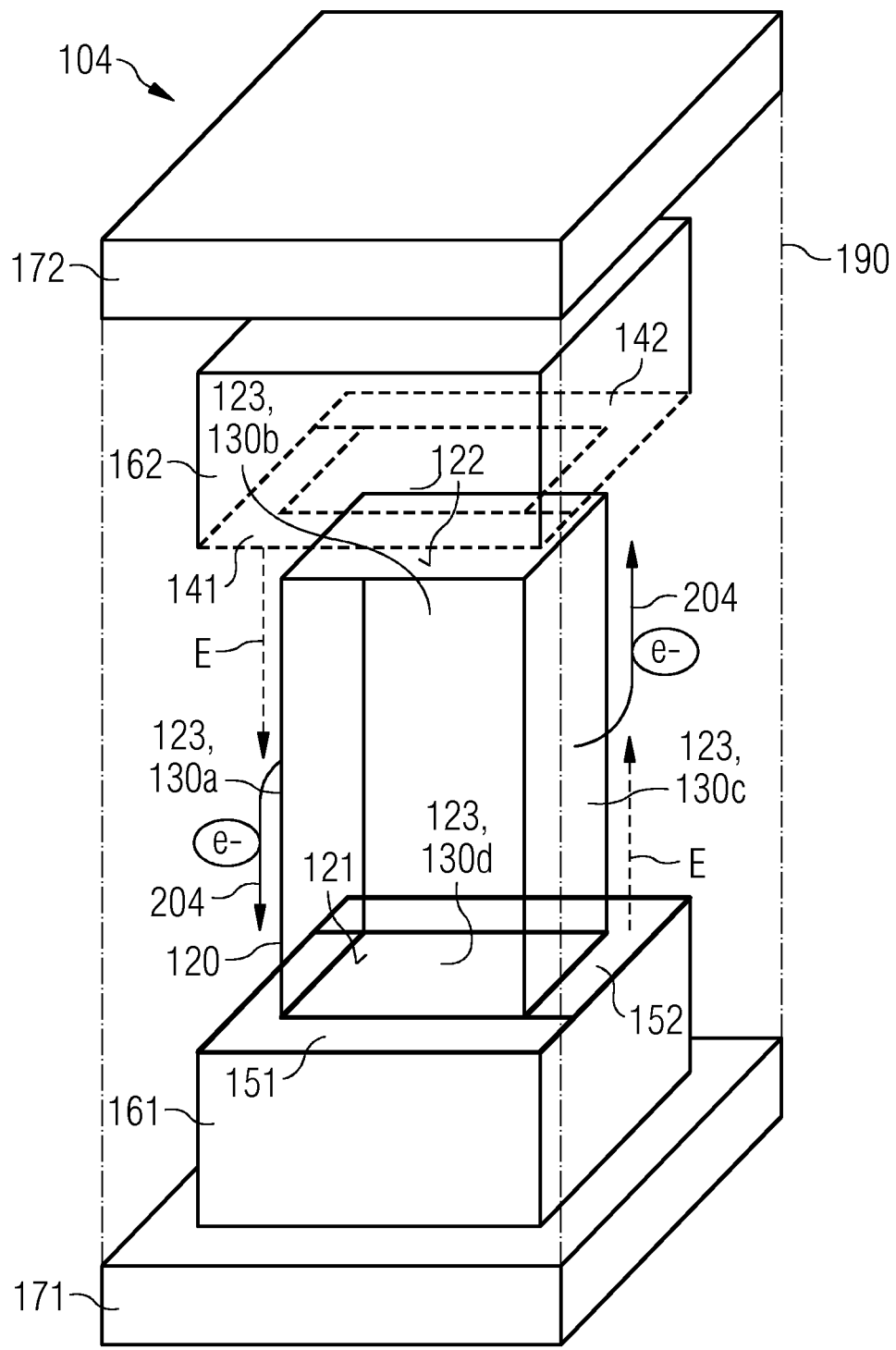
FIG. 9 shows a schematic perspective illustration of the detector element constructed in accordance with the components of FIGS. 7 and 8.

FIG. 9 shows a schematic perspective illustration of one embodiment of the detector element 104 having additional constituent parts for detecting the electrons 204 moved in different directions. The detector element 104 includes a first and second microchannel plate 161, 162 and a first and second detection device 171, 172. These components 161, 162, 171, 172 may be constructed in the manner described above with reference to the detector elements 101, 102.

As is shown in FIG. 9, the first microchannel plate 161 is arranged in the region of the rear side 121 of the scintillator 120 or opposite the rear side 121. The two electrodes 151, 152 are arranged on the front side of the microchannel plate 161. In this case, a construction comparable with FIG. 4 may be present. In other words, the electrodes 151, 152 may include a surface profile comparable with the electrode 150 and openings exposing channels of the microchannel plate 161. The scintillator 120 and the microchannel plate 161 may directly adjoin one another. The microchannel plate 161 may include, for example, one or more projecting supporting structures. The detection device 171 provided on the rear side of the microchannel plate 161 may be directly connected to the microchannel plate 161 and may include one or a plurality of trapping electrodes for detecting electrons 204 multiplied in the microchannel plate 161.

A configuration that is symmetrical thereto is provided for the second microchannel plate 162 and the second detection device 172. The second microchannel plate 162 is arranged in the region of the front side 122 of the scintillator 120 or opposite the front side 122. The other two electrodes 141, 142 are arranged on the front side of the microchannel plate 162. In this case, a construction comparable with FIG. 4 may likewise be present. In other words, the electrodes 141, 142 may include a surface profile comparable with the electrode 150 and openings exposing channels of the microchannel plate 162. The scintillator 120 and the microchannel plate 162 may directly adjoin one another. The microchannel plate 162 may likewise include, for example, one or a plurality of projecting supporting structures. The detection device 172 provided on the rear side of the microchannel plate 162 may (contrary to the illustration in FIG. 9) be directly connected to the microchannel plate 162 and may include one or a plurality of trapping electrodes for detecting electrons 204 multiplied in the microchannel plate 162.

During the operation of the detector element 104, the front side 122 of the scintillator 120 may face the high-energy radiation to be detected. The radiation may transmit through the detection device 172 and the microchannel plate 162 and subsequently be incident in the scintillator 120. The scintillation radiation generated owing to an interaction may be converted into electrons 204 at the lateral walls 123 of the scintillator by the photocathode sections 130a, 130b, 130c, 130d. The electrons are accelerated in different directions and to different electrodes 142 or 151 depending on the respectively emitting photocathode section 130a, 130b, 130c, 130d, in the manner described above with reference to FIGS. 7, 8. The electrons 204 impinging on the electrodes 142, 151 may liberate further electrons 204. The electrons 204 are furthermore multiplied in the associated microchannel plates 161, 162 and detected by the associated detection devices 171, 172.

In this case, electrons 204 generated by the photocathode sections 130a, 130d are accelerated by the electrodes 141, 151 to the lower microchannel plate 161, are multiplied, and detected by the detection device 171. By contrast, the electrons 204 generated by the photocathode sections 130b, 130c are accelerated by the electrodes 152, 142 to the upper microchannel plate 162, are multiplied, and detected by the detection device 172.

The detection of electrons 204 or electron avalanches in different directions affords the possibility of determining the height or depth ("Z-position") of an interaction of a radiation quantum 200 that excites the scintillator 120. In this case, it is possible to make use of the fact that the point in time or the temporal development and/or the magnitude of the quantities of charge detected via the detection devices 171, 172 are/is dependent on the proximity of the interaction to the front or rear side 122, 121 of the scintillator 120. In this case, too, corresponding summation and/or difference signals may be formed from individual measurement signals obtained by the detection devices 171, 172.

As described above, all the electrodes 141, 142, 151, 152 of the detector element 104 may include a structured surface profile and openings for exposing channels of the respective microchannel plates 161, 162. This affords the possibility that the electrodes of the two electrode pairs 141, 142 and 151, 152 may optionally be used either as cathode or as dynode (to which electrons 204 are accelerated). By way of example, provision may also be made, contrary to the illustration in FIGS. 7 and 9, for using the electrode pair 141, 151 to generate an electric field E directed upward in the direction of the microchannel plate 162, and using the electrode pair 142, 152 to generate an electric field E directed downward in the direction of the microchannel plate 161. The electric field E may be determined depending on the voltage respectively applied to the electrode pairs 141, 151 and 142, 152. Consideration may be given, if appropriate, to multiplying and detecting electrons 204 only in one direction. "Unidirectional" electric fields E are generated by the electrode pairs 141, 151 and 142, 152. In the case of a function as dynode, the electrons 204 accelerated to the relevant electrode may impinge thereon and liberate further electrons 204. The electrons 204 may subsequently enter into the channels of the respective microchannel plates 161, 162 via the openings and may be multiplied.

Instead of such a flexible manner of operation, a fixedly predefined function as cathode and dynode may also be provided for the electrode pairs 141, 151 and 142, 152. In this case, an electrode operated as cathode does not require a structured surface, nor any openings, since no electrons 204 are accelerated to such an electrode either. It is not necessary for a microchannel plate to be provided with channels in the region of such an electrode. With regard to such a fixedly predefined manner of operation of the electrode pairs 141, 151 and 142, 152, therefore, in a departure from the above description, provision may be made for an electrode operated as cathode not to include a surface profile nor to include openings. Thus, an associated microchannel plate also includes no channels, if appropriate, in this region. In this case, the electrode operated as cathode may be present as a planar continuous layer.

With regard to the detector element 104 from FIG. 9, the possibility is furthermore afforded that, in a manner comparable with the detector element 102, a further (optional) photocathode layer is provided on one of the end faces 121, 122 of the scintillator 120. If appropriate, both end faces 121, 122 may also be coated (e.g., partly coated) with a photocathode. In configurations of this type, the detector element 104 may include a corresponding electrode arrangement with the aid of which the electrons 204 emitted at the end face or at the end faces 121, 122 may also be accelerated in the direction of the associated microchannel plate 161 or 162. For this purpose, the electrode arrangement having the electrodes 141, 142, 151, 152, as shown in FIGS. 7 to 9, may be modified such that corresponding electrodes or electrode layers are also arranged in the regions enclosed in a frame-shaped manner by the electrodes 141, 142 and the electrodes 151, 152. Such electrodes may also be arranged on the microchannel plates 161, 162 and include (if appropriate) a surface profile and openings.

Instead of embodying a detector element with only a single scintillator 120, modular configurations of detector elements including a plurality of scintillators 120 arranged alongside one another, which may be constructed in accordance with the approaches demonstrated above, may also be provided. Possible exemplary embodiments that may be realized cost-effectively, if appropriate, and are based on the detector elements 102, 103, 104 described above are described in greater detail below. In this case, with regard to details concerning aspects and components of the same type or corresponding aspects and components, reference is made to the above explanations concerning the detector elements 102, 103, 104.

Figure 10:
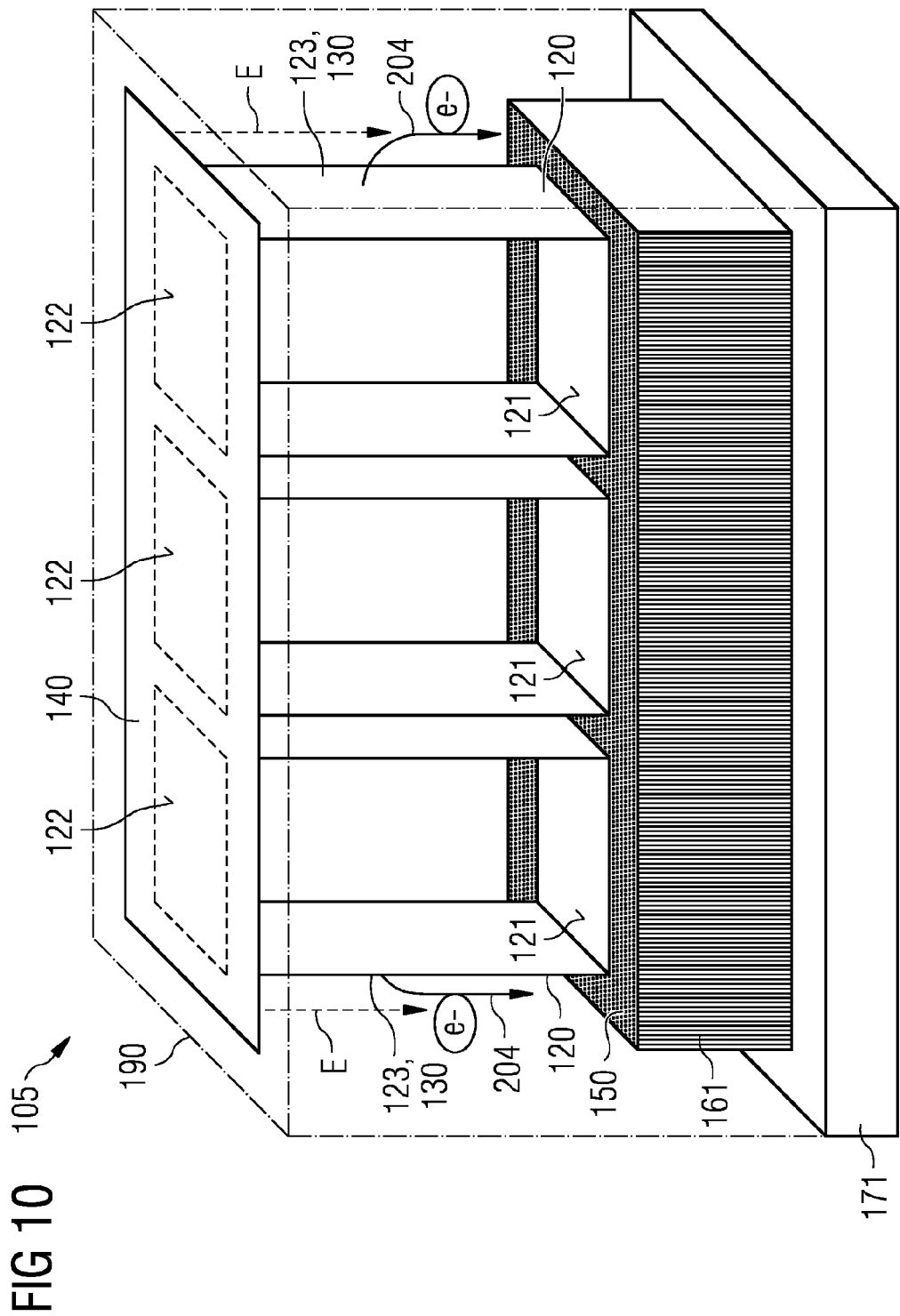
FIG. 10 shows a schematic perspective illustration of a further detector element including a plurality of scintillators arranged alongside one another.

FIG. 10 shows a schematic perspective illustration of a further detector element 105, which is constructed in a manner comparable with the detector element 102 from FIG. 3 and includes three scintillators 120 arranged alongside one another. The parallelepipedal scintillators 120 are provided with photocathode sections 130 on (all) lateral walls 123. A further photocathode coating on the rear sides 121 of the scintillators 120 may also be provided.

A plate-shaped electrode 140 used as cathode is arranged in the region of the front sides 122 or on the front sides 122 of the scintillators 120 and extends laterally beyond the edges thereof. Another electrode 150 is arranged on a microchannel plate 161 assigned to the three scintillators 120. The microchannel plate 161 is arranged in the region of the rear sides 121 of the scintillators 120 or opposite the rear sides 121. The electrode 150 and the microchannel plate 161 extend laterally beyond the edges of the rear sides 121 of the scintillators 120. The microchannel plate 161 and the electrode 150 may have a configuration corresponding to FIG. 4, such that with regard to further details, reference is made to the explanations above. This applies in the same way also to a detection device 171 arranged on the microchannel plate 161.

Using the electrodes 140, 150, an electric field E may be generated parallel to the longitudinal axes of the scintillators 120. Electrons 204 generated photoelectrically at the lateral walls 123 of the scintillators may be accelerated to the electrode 150. Electrons 204 emitted (if appropriate) at the rear sides 121 may also be accelerated to the electrode 150. The electrons 204 may once again eject further electrons 204 from the electrode 150, may be multiplied (further) in the microchannel plate 161, and may be detected by the detection device 171.

Figure 11:
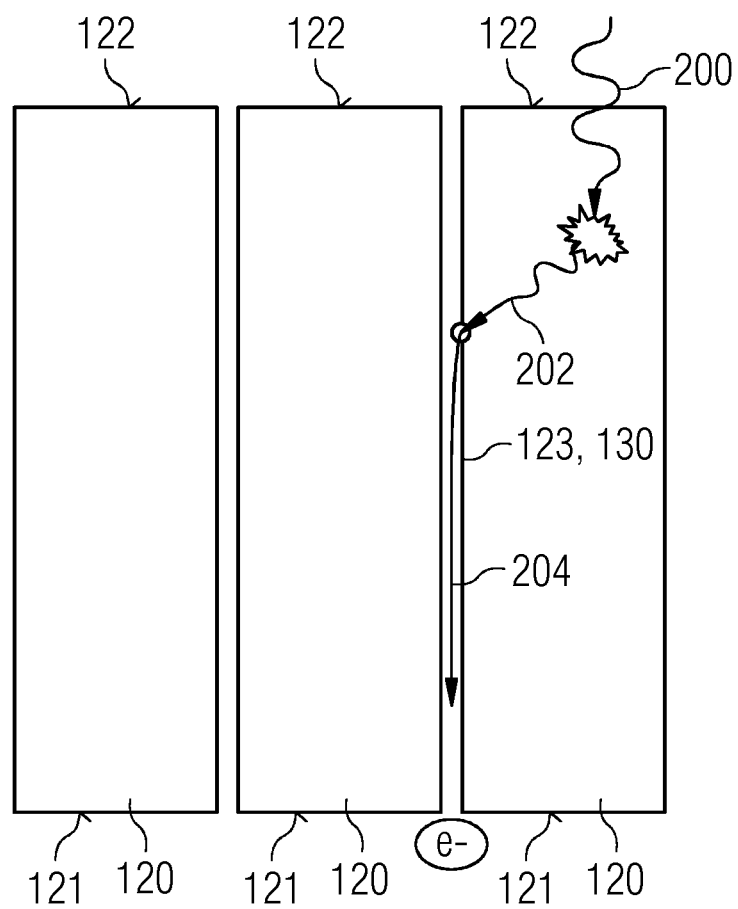
FIG. 11 shows a schematic lateral illustration of the plurality of scintillators of the detector element from FIG. 10.

A movement of electrons also takes place in the gaps between the individual scintillators 120. For elucidation, FIG. 11 shows a schematic lateral illustration of the three scintillators 120 arranged alongside one another in the detector element 105 from FIG. 10. The scintillators 120 may be arranged relatively near to one another, as a result of which a loss in the form of radiation quanta 200 that move between the scintillators 120 and therefore do not interact with the scintillators 120 may be largely avoided. By way of example, relatively small distances in the range of a few 10 µm to a few 100 µm between the scintillators 120 may be provided. As is indicated in FIG. 11, the electrons 204 generated by the photocathode sections 130 at the lateral walls 123, in the gaps between the scintillators 120, may likewise be accelerated to the electrode 150 or to the microchannel plate 161.

With regard to the detector element 105, the possibility is provided that all electrons 204 that are generated photoelectrically by and come from the scintillators 120 and are multiplied in the microchannel plate 161 are detected jointly by the detection device 171. Alternatively, electrons 204 that come from the individual scintillators 120 and are multiplied may also be detected independently of one another or separately from one another. For this purpose, the detection device 171 may have electrode regions assigned to the individual scintillators 120.

The possibility is provided of designing the detector element 105 or the detection device 171 thereof in a manner comparable with the detector element 103 for separately detecting electrons 204 that are generated by different photocathodes 130 or at different lateral walls 123 of a scintillator 120 and are multiplied, such that in this case, too, a lateral interaction location in a scintillator 120 may be determined. For this purpose, the detection device 171 may be provided with a plurality of electrode regions or segments per scintillator 120, which are assigned to the individual photocathode sections 130 of the scintillators 120.

Figure 12:
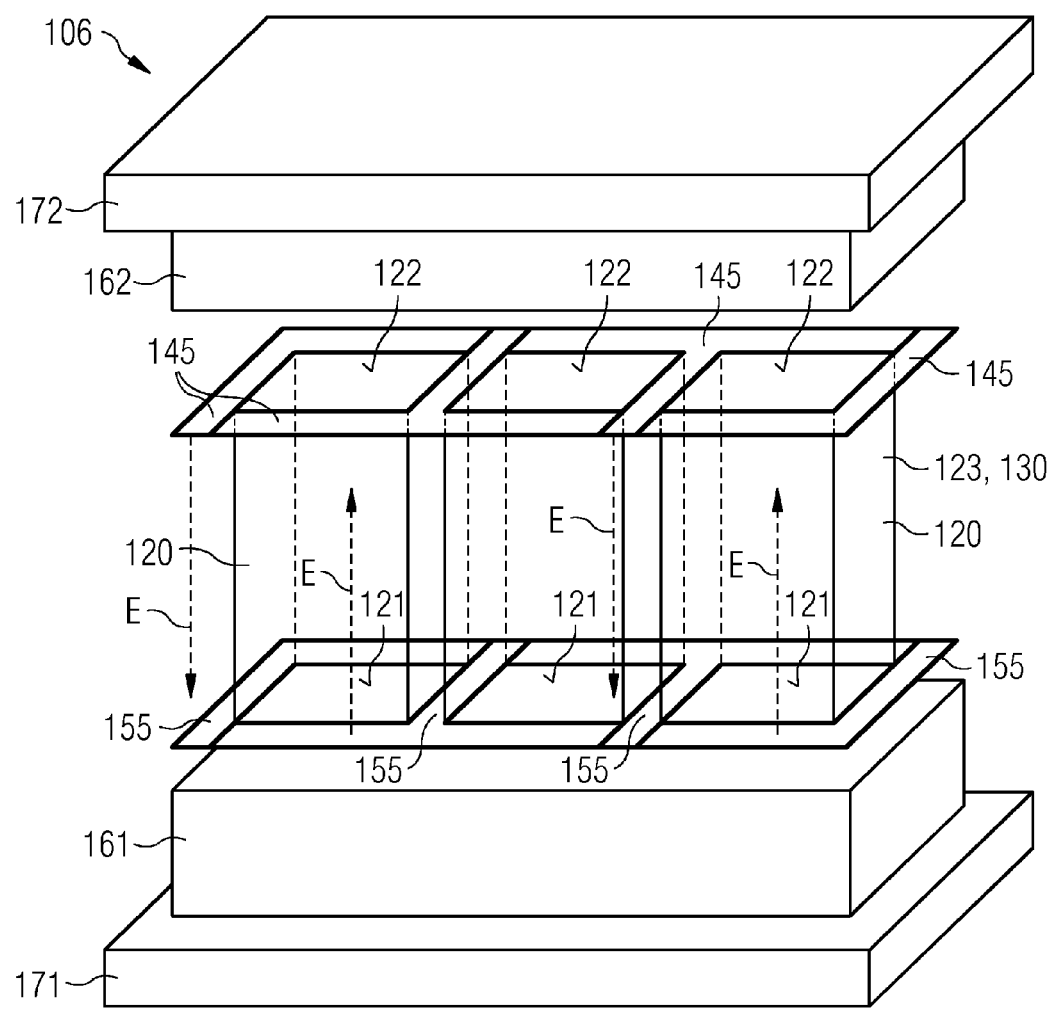
FIG. 12 shows a schematic perspective illustration of a further detector element including a plurality of scintillators arranged alongside one another, where the detector element is configured to bring about electron movements in different directions.

In the case of a modular configuration of a detector element including a plurality of scintillators 120, consideration may also be given to bringing about electron movements in different directions. For exemplary elucidation, FIG. 12 illustrates, in a schematic perspective illustration, a further detector element 106 including three scintillators 120 arranged alongside one another. The detector element is constructed in a manner comparable with the detector element 104 from FIG. 9. The detector element 106 therefore once again includes an electrode arrangement comprising electrodes 145, 155 arranged one above another or situated opposite one another. The electrodes 155 are provided on the front side of a first microchannel plate 161, and the other electrodes 145 are provided on the front side of a second microchannel plate 162. The first microchannel plate 161 is arranged in the region of the rear sides 121, and the second microchannel plate 162 is arranged in the region of the front sides 122 of the scintillators 120. A first detection device 171 is assigned to the first microchannel plate 161, and a second detection device 172 is assigned to the second microchannel plate 162.

Using the electrodes 145, 155 situated opposite one another in pairs, which are embodied partly as L-shaped and partly as T-shaped and which are arranged on different lateral walls 123 or photocathode sections 130 of the scintillators 120, electric fields E may be produced in different directions or mutually opposite directions. In this way, electrons 204 emitted at different lateral walls 123 of the scintillators 120 may once again be accelerated in different directions, and thus either to the first or to the second microchannel plate 161, 162. The electrons 204 multiplied may, for example, be detected by the respective detection devices 171, 172. As a result of this, on the basis thereof, a depth or height of interactions in the scintillators 120 may be determined.

The embodiments explained with reference to the figures constitute exemplary embodiments. Alongside the embodiments described and depicted, further embodiments that may include further modifications and/or combinations of features described may be provided. The detectors or detector elements explained with reference to the figures may also include further structures (not illustrated) alongside the structures shown and described. One possible example is a connection structure that is connected to one or more photocathode sections in order to "compensate" again for the photoelectric emission of electrons by charging the photocathode section or the plurality of photocathode sections.

Furthermore, different materials than those indicated above may be used for a detector element or the components thereof. With regard to alternative materials, instead of a semiconductor material or instead of silicon, for example, consideration may be given to a glass material as basic material for a microchannel plate.

A detector element or the components thereof may have different dimensions than those indicated above, and a detector element or the components thereof may be embodied with other geometries that deviate from the exemplary embodiments shown in the figures. Other geometries may be considered, for example, for electrode arrangements (e.g., for electrode arrangements for bringing about electron movements in opposite directions).

A scintillator 120 may have, instead of a parallelepipedal shape, a different shape having two mutually opposite end faces and at least one lateral wall between the end faces. The end faces are connected to one another via the lateral wall, and a photocathode section may be provided on the lateral wall. One possible example is a scintillator having a cylindrical or circular-cylindrical shape. In this case, a photocathode section may be provided on a lateral wall (e.g., lateral surface) between the end faces of the scintillator. The photocathode section may, for example, completely enclose the scintillator in order to efficiently convert scintillation radiation emitted to the lateral wall into electrons.

With regard to a scintillator having two mutually opposite end faces and a plurality of lateral walls situated therebetween, provision may be made for arranging a photocathode section only on one individual lateral wall or photocathode sections only on a portion of the lateral walls, such that one or more lateral walls are uncoated. In one embodiment, in the case of a scintillator having one or a plurality of lateral walls arranged between two end faces, one or a plurality of lateral walls may be provided with a photocathode section only in a partial region, rather than completely. Provision may also be made for forming photocathode sections only on lateral walls of scintillators, and for leaving the end faces of the scintillators uncoated.

In configurations of this type, a microchannel plate may be embodied such that microchannels are present only in the partial regions to which electrons to be multiplied are actually moved. In a corresponding manner, an electrode that is arranged on a microchannel plate and functions as a dynode and to which photoelectrons are accelerated may be formed only in a partial region on the relevant microchannel plate (or the front side thereof). In a manner comparable therewith, a detection device may include one or a plurality of trapping electrodes only in a region (e.g., a partial region) in which channels or channels utilized for electron multiplication in an associated microchannel plate are present.

In the case of such geometries, configurations, and coatings of a scintillator, the approaches indicated above may be considered in an analogous manner in order, for example, to separately multiply and detect electrons generated by different photocathode sections or by different subsections of a photocathode section. If appropriate, the electrons may be deflected or accelerated in different directions, etc.

In the case of a modular configuration of a detector element, instead of three scintillators 120 arranged alongside one another (see FIGS. 10, 12), other numbers of scintillators 120 arranged alongside one another may also be provided. In this case, there is also the possibility of the scintillators 120 being arranged alongside one another, for example, in a matrix-type fashion in the form of rows and columns. In this case, the parallelepipedal configuration of the scintillators 120, as shown in the figures, proves to be advantageous for arranging the scintillators 120 alongside one another relatively closely and with small gaps.

Although the invention has been described and illustrated more specifically in detail using exemplary embodiments, the invention is nevertheless not restricted by the examples disclosed. Other variations may be derived therefrom by a person skilled in the art without departing from the scope of protection of the invention.

The invention claimed is:

1. A radiation detector comprising:
   a scintillator for generating electromagnetic radiation in response to action of incident radiation, wherein the scintillator has two mutually opposite end faces and a lateral wall between the two mutually opposite end faces;
   a photocathode section arranged on the lateral wall of the scintillator, the photocathode section being configured to generate electrons in response to action of the electromagnetic radiation generated by the scintillator;
   a microchannel plate having a plurality of channels for multiplying the electrons generated by the photocathode section; and
   a detection device for detecting the electrons multiplied by the microchannel plate,
   wherein the scintillator is configured in a parallelepipedal fashion and has four lateral walls between the end faces, and
   wherein a photocathode section for generating electrons is arranged on each of the four lateral walls of the scintillator.

2. The radiation detector of claim 1, wherein a further photocathode section for generating electrons is arranged on an end face of the scintillator.

3. The radiation detector of claim 1, further comprising an electrode arrangement for bringing about a movement of generated electrons to the microchannel plate.

4. The radiation detector of claim 3, wherein the electrode arrangement comprises:
   a first electrode that is arranged in a region of an end face of the scintillator; and
   a second electrode that is arranged on the microchannel plate.

5. The radiation detector of claim 4, wherein the second electrode is configured in the form of a structured layer and has openings via which channels of the microchannel plate are exposed.

6. The radiation detector of claim 1, wherein the microchannel plate is configured for multiplying electrons generated by different photocathode sections.

7. The radiation detector of claim 1, wherein the detection device is configured for separately detecting electrons generated and multiplied by different photocathode sections.

8. The radiation detector of claim 1, wherein the scintillator, the microchannel plate, and the detection device are arranged one above another.

9. The radiation detector of claim 1, wherein the microchannel plate is a first microchannel plate, and the detection device is a first detection device, and
   wherein the radiation detector further comprises:
      a first photocathode section and a second photocathode section arranged on a lateral wall of the four lateral walls of the scintillator and configured for generating electrons;
      a second microchannel plate for multiplying electrons;
      an electrode arrangement configured to bring about a movement of electrons generated by the first photocathode section to the first microchannel plate and electrons generated by the second photocathode section to the second microchannel plate;
      a first detection device for detecting electrons multiplied by the first microchannel plate; and
      a second detection device for detecting electrons multiplied by the second microchannel plate, the first detection device being for detecting electrons multiplied by the first microchannel plate.

10. The radiation detector of claim 1, further comprising:
    a plurality of scintillators that are arranged alongside one another and on the lateral walls of which are arranged photocathode sections for generating electrons, the plurality of scintillators comprising the scintillator,
    wherein the microchannel plate for multiplying is configured to multiply electrons generated by photocathode sections of the plurality of scintillators, and
    wherein the detection device for detecting is configured to detect the electrons generated by the photocathode sections of the plurality of scintillators and multiplied by the microchannel plate.

11. An imaging system comprising:
    a radiation detector comprising:
    a scintillator for generating electromagnetic radiation in response to the action of incident radiation, wherein the scintillator has two mutually opposite end faces and a lateral wall between the end faces;
    a photocathode section arranged on the lateral wall of the scintillator and serving for generating electrons in response to the action of the electromagnetic radiation generated by the scintillator;
    a microchannel plate having a plurality of channels for multiplying the electrons generated by the photocathode section; and
    a detection device for detecting the electrons multiplied by the microchannel plate,
    wherein the scintillator is configured in a parallelpidedal fashion and has four lateral walls between the end faces, and
    wherein a photocathode section for generating electrons is arranged on each of the four lateral walls of the scintillator.

* * * * *

UNITED STATES PATENT AND TRADEMARK OFFICE
CERTIFICATE OF CORRECTION

| | | |
|---|---|---|
| PATENT NO. | : 9,097,808 B2 | Page 1 of 1 |
| APPLICATION NO. | : 14/124713 | |
| DATED | : August 4, 2015 | |
| INVENTOR(S) | : Hedler et al. | |

It is certified that error appears in the above-identified patent and that said Letters Patent is hereby corrected as shown below:

In the claims:

Column 22, claim 10, line 30, delete "for multiplying" before "is configured".

Column 22, claim 10, line 33, delete "for detecting" before "is configured".

Signed and Sealed this
Nineteenth Day of January, 2016

Michelle K. Lee
*Director of the United States Patent and Trademark Office*